United States Patent [19]
Geus et al.

[11] Patent Number: 5,692,028
[45] Date of Patent: Nov. 25, 1997

[54] X-RAY EXAMINING APPARATUS FOR LARGE-VOLUME GOODS

[75] Inventors: Georg Geus, Wiesbaden-Freudenberg; Norman Hahn, Wiesbaden; Bernd Zollmann, Hühnfeldern-Nauheim, all of Germany

[73] Assignee: Heimann Systems GmbH, Wiesbaden, Germany

[21] Appl. No.: 708,936

[22] Filed: Sep. 6, 1996

[30] Foreign Application Priority Data

Sep. 7, 1995 [DE] Germany ............... 195 32 965.1

[51] Int. Cl.⁶ ................................................. G01N 23/04
[52] U.S. Cl. ............................. 378/57; 378/196; 378/198
[58] Field of Search ............................ 378/57–62, 146, 378/189, 193–198

[56] References Cited

U.S. PATENT DOCUMENTS 5,132,995  7/1992  Stein ........................ 378/146

FOREIGN PATENT DOCUMENTS

| 0 271 723 | 6/1988 | European Pat. Off. . |
| 0 412 190 | 2/1991 | European Pat. Off. . |
| 0 491 977 | 7/1992 | European Pat. Off. . |
| 07027721 | 1/1995 | Japan . |
| 2277013 | 10/1994 | United Kingdom . |

*Primary Examiner*—Don Wong
*Attorney, Agent, or Firm*—Spencer & Frank

[57] ABSTRACT

An X-ray examining system includes a mobile vehicle; and an X-ray examining apparatus for ascertaining contents of an object. The examining apparatus includes a supporting structure mounted on the mobile vehicle; and X-ray source for generating a fan-shaped X-ray and being carried by the vehicle; and an X-ray detector mounted on the supporting structure. The X-ray examining system is adapted to travel along the object to be examined while irradiating the object and detecting the X-rays after passage thereof through the object.

5 Claims, 3 Drawing Sheets

X-RAY EXAMINING APPARATUS FOR LARGE-VOLUME GOODS

CROSS REFERENCE TO RELATED APPLICATION

This application claims the priority of German Application No. 195 32 965.1 filed Sep. 7, 1995, which is incorporated herein by reference.

BACKGROUND OF THE INVENTION

This invention relates to an X-ray examining apparatus and is of the type which has an X-ray source generating a fan-shaped X-ray beam for penetrating the goods and an X-ray detector placed behind the goods as viewed in the direction of X-ray beam propagation.

X-ray examining apparatus of the above-outlined type essentially serve for monitoring the contents of "container"-type transport receptacles and trucks. The X-ray apparatus generates high-resolution X-ray images which provide a very effective verifying tool with a high degree of detection accuracy, particularly when the obtained images can be compared with shipping papers. Tests have shown that as a rule, of 3–5% of the monitored transports approximately 70% of the goods are falsely declared and only 30% of all the transports pass without objection. Particularly the smuggling of luxury items and high-technology electronics equipment has substantially increased in recent years. The explosive growth in international freight traffic makes a monitoring of freight transports more and more difficult. For obtaining superior images, high X-ray energy, for example between 2–10 MeV, has to be used. For obtaining such high-resolution radiation images, however, a very high technological outlay for generating and detecting the radiation is required. Further, an independent transport system needed for such apparatus, the radiation safety arrangements and the infrastructure require a substantial surface area. A mobilized use of conventional systems of this type at different locations has not been feasible.

German Offenlegungsschrift (application published without examination) No. 43 11 174 discloses an X-ray examining apparatus where the goods to be examined are driven in a truck by the driver along an examining track. In such an X-ray examining apparatus too, the beam generator and the detecting device are fixed, stationary components of the examining track. Because of measures to ensure radiation safety for the driver, such an X-ray examining apparatus does not provide for an irradiation of the entire object, for example, a complete truck.

SUMMARY OF THE INVENTION

It is an object of the invention to provide a mobile X-ray examining apparatus for monitoring large-volume goods, such as containers, trucks, cars and the like which is particularly adapted to detect smuggled objects such as luxury items and high-technology electronic apparatus in a simple and economical manner.

This object and others to become apparent as the specification progresses, are accomplished by the invention, according to which, briefly stated, the X-ray examining system includes a mobile vehicle and an X-ray examining apparatus for ascertaining contents of an object. The examining apparatus includes a supporting structure mounted on the mobile vehicle; an X-ray source, carried by the vehicle, for generating a fan-shaped X-ray beam; and an X-ray detector mounted on the supporting structure. The X-ray examining system is adapted to travel along the object to be examined while irradiating the object and detecting the X-rays after passage thereof through the object.

The invention is based on the principle that the X-ray examining system is a self-propelled unit which is moved relative to the stationary object to be examined. The X-ray examining apparatus is mounted on a vehicle and thus, monitoring the contents of, for example, a truck by X-ray irradiation, may be effected in a simple and economical manner as the vehicle passes by the goods to be monitored. The vehicle may be operated by a driver or may be driven automatically. An exposure of the driver to X-rays cannot occur because the driver's cab is, for protecting the driver from irradiation, situated externally of the danger zone relative to the X-ray apparatus which is fixedly installed on the vehicle.

The X-ray apparatus is, from a space-saving transporting position, for example, from a rear portion of a special vehicle, pivotal into a laterally projecting, portal-shaped operative position so that during the travel of the special vehicle past the goods to be monitored, the portal may be moved at a low speed over the object, while the X-ray apparatus is in operation. During operation, a fan-shaped X-ray beam generated by the X-ray apparatus installed in the portal traverses the object to be examined. An L-shaped detector unit facing the X-ray generator and also mounted in the portal receives the shadow image of the object. By means of a signal-preparing and image-processing electronic system not described in detail, the radiation image is processed and stored in an image memory. The image information may be displayed by means of a monitor. Tests have shown that X-ray energies up to 500 kev, preferably 140 kev or 300 kev suffice for a simple recognition of conspicuous objects in an environment of medium density.

The apparatus according to the invention designed as a mobile, self-propelled system for the X-ray examination of stationary objects represents a significant simplification and increase in efficiency. In addition to a high degree of flexibility, mobility and simple servicing, substantial advantages of the invention reside in the complete capture of the entire object to be examined, the small number of operating personnel (the operator may have the dual role of driver and image evaluator), the omission of adjusting steps, the simplification of the process logistics and, last but not least, a high rate of examination.

Locations where the X-ray examining apparatus incorporating the invention may find application are, for example, border check points, seaports, airports, highway toll stations, freight transport centers, general security zones, industrial and military installations, and material examining stations for approving containers and other transport receptacles for subsequent use.

Instead of mounting the apparatus on a motorized vehicle, it is feasible to install the apparatus on a trailer.

By designing the system for X-ray sources up to 500 kev, weapons and drugs in an environment of medium density may be detected. Further, the apparatus may be designed as a multi-beam system with which two or more parallel, fan-shaped X-ray beams may be generated in the portal. The advantage of such arrangement resides in that by choosing different beam geometries, different views of the object under examination may be obtained, whereby object recognition may be improved. Thus, an irradiation of the object is feasible bilaterally and from above as the vehicle carrying the X-ray apparatus passes by. It is noted, however, that, as a rule, the use of a single fan-shaped beam is sufficient.

DESCRIPTION OF THE PREFERRED EMBODIMENTS

Figure 1:
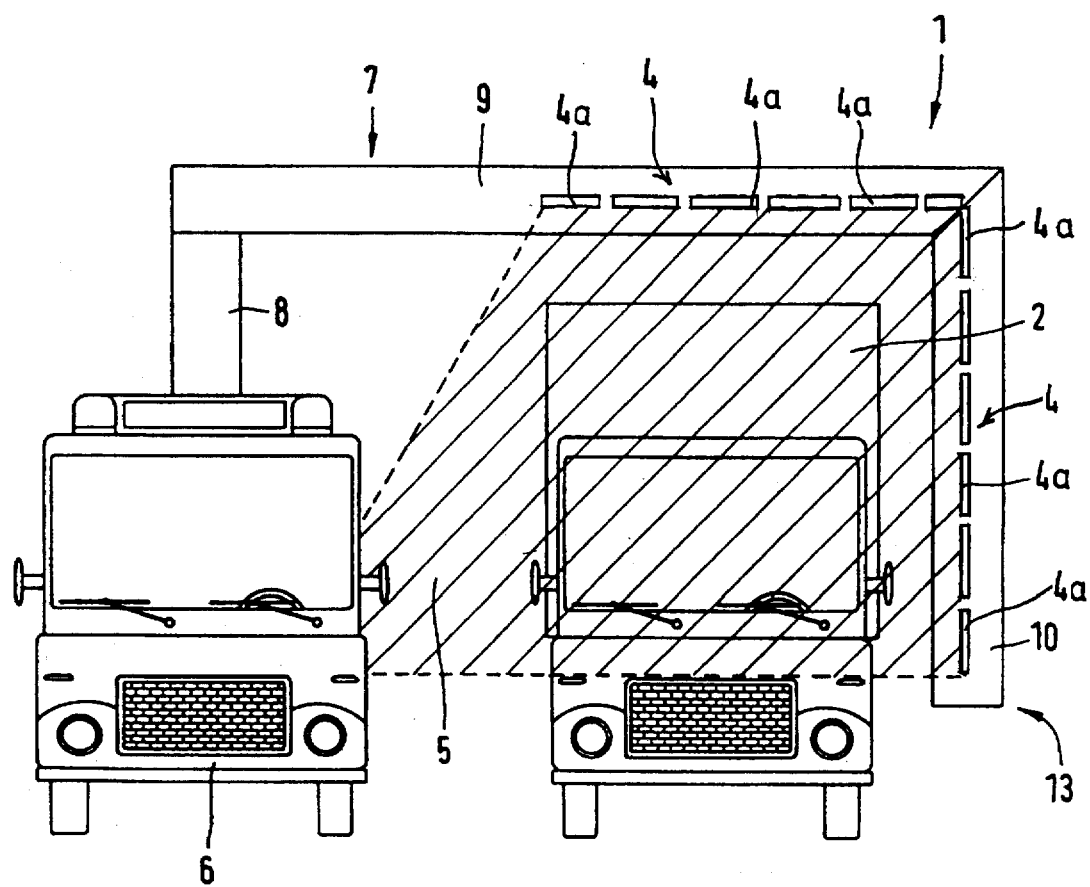
FIG. 1 is a schematic front elevational view of a special motor vehicle carrying an X-ray examining apparatus according to the invention, shown in an operative position.
Figure 2:
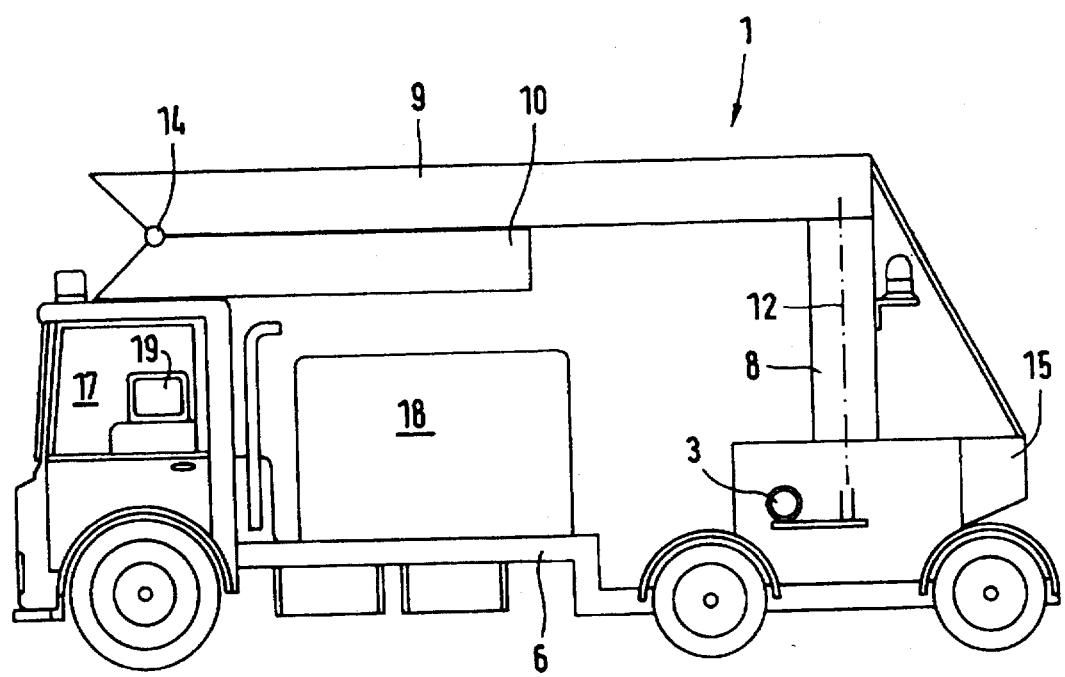
FIG. 2 is a schematic side elevational view of the vehicle, showing the X-ray examining apparatus in an inoperative, transporting position.

Turning to FIGS. 1 and 2, an X-ray examining apparatus 1 is mounted on the read portion of a special motor vehicle 6 for rotary swinging motion about a vertical axis 12. The X-ray examining apparatus 1, as particularly well seen in FIG. 1, includes a supporting structure formed of a portal or gate-shaped assembly 7 so that, as the vehicle 6 passes by an object to be examined, for example, another vehicle 2, the X-ray examining apparatus surrounds the object at three sides.

The portal 7 has a generally vertical column 8 mounted on the vehicle 6, a generally horizontal beam 9 affixed to the top of the column 8 and an arm 10 mounted on the outer end of the beam 9. The column 8 is rotatable about a vertical axis 12, while the arm 10 is pivotally attached to the beam 9 at 14. Thus, the arm 10 is able to assume a vertical, operative position as illustrated in FIG. 1 and a horizontal, inoperative, folded position as shown in FIG. 2. The column 8, the beam 9 and the arm 10 may be pivoted in a horizontal plane as a unit about the vertical column axis 12.

Adjacent the lower part of the column 8 an X-ray generator (X-ray source) 3 is mounted such that it is movable with the column 8 as a unit. The X-ray sources 3 generates a fan-shaped X-ray beam 5, generally in the portal plane defined by the portal components 8, 9 and 10.

Detector elements 4a are mounted on the beam 9 and the arm 10 so that in the operative, unfolded sate 13 of the arm 10 the detector elements 4a form an L-shaped detector assembly generally designated at 4.

The column 8 is height-adjustable, whereby the height level of the horizontal beam 9 may be altered, for example, for the purpose of adjusting the lower edge of the fan-shaped X-ray beam 5 relative to the road surface to thus effect optimal adaptations to objects, particularly wall heights of the vehicles to be examined.

On the beam 9 and/or the arm 10 of the portal 7 a plurality of X-ray systems may be arranged for performing irradiations from various angles. Thus, for example, for a detection from opposite directions, on the beam 9 and/or the arm 10 at least one detector unit 4 and at least one X-ray generator 3 are arranged behind one another as viewed in the travelling direction 16 shown in FIG. 3a, for providing a respective, fan-shaped X-ray beam penetration and detection.

In case an X-ray generator is mounted, for example, on the arm 10, additional, non-illustrated X-ray detector elements 4a may be arranged on the column 8.

To provide for a simple, fan-shaped irradiation, the X-ray source 3 is pivotal together with the column 8, ensuring a fan-shaped irradiation plane between the X-ray source and the X-ray detectors when the portal 7 is in the operational position as shown in FIG. 1.

Referring once again to FIG. 2, there are shown a counterweight 15 secured to the outer face of the column 8 to be rotatable therewith as a unit about the column axis 12, an electronic equipment 18 and an evaluating station 19 situated in the driver's cab 17 of the vehicle 6. By such a fixedly mounted arrangement of all of the components of the X-ray examining apparatus 1, all complex adjusting devices required for the system disclosed in German Offenlegungsschrift No. 43 11 174 may be dispensed with.

FIG. 2 shows the X-ray apparatus 1 in the transporting position in which the beam 9 is situated vertically above the carrier vehicle 6 and the arm 10 is folded against the beam 9 to extend parallel therewith. To deploy the X-ray apparatus 1 into the configuration of the portal 7, the column 8 is rotated about the axis 12 through approximately 90°, whereby the beam 9 and the arm 10 are swung out laterally and thereafter the arm 10 is pivoted 90° to assume a vertical, downward orientation.

Figure 3A:
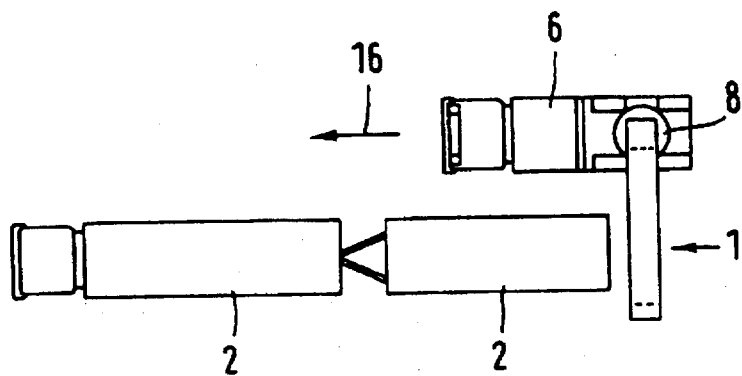
FIGS. 3a, 3b and 3c are schematic top plan views, depicting three consecutive moments of an X-ray examination by the apparatus according to the invention.
Figure 3B:
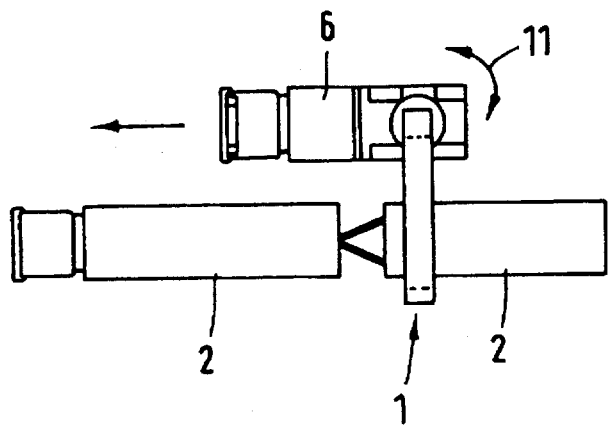
Figure 3C:
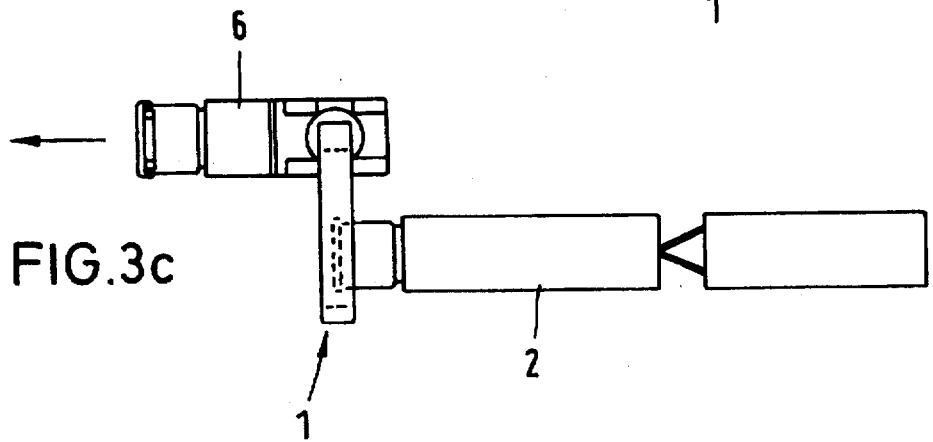

FIGS. 3a, 3b and 3c show the progression of the X-ray apparatus 1 relative to the stationary vehicle 2 to be examined.

The entire X-ray examining apparatus is, from the point of view of protection of harmful effects of X-rays, so designed and screened that an operation with X-ray sources of 300–500 kev is possible.

It will be understood that the above description of the present invention is susceptible to various modifications, changes and adaptations, and the same are intended to be comprehended within the meaning and range of equivalents of the appended claims.

What is claimed is:

1. An X-ray examining system comprising (a) a mobile vehicle; and (b) an X-ray examining apparatus for ascertaining contents of an object; said apparatus including (1) a supporting structure mounted on said mobile vehicle; said supporting structure being portal-shaped for surrounding the object on top and on opposite sides thereof during X-ray examination; said supporting structure including (i) a generally vertical column mounted on said vehicle and rotatable relative to said vehicle about a generally vertical axis; said column having an upper end;

(ii) a generally horizontal beam having opposite first and second end portions; said beam being attached to said upper end at said first end portion for rotation with said column as a unit for assuming an inoperative position vertically above said mobile vehicle and an operative position in which said beam extends laterally from said vehicle; and (iii) an arm pivotally attached to said second end portion of said beam for assuming an inoperative position in which said arm extends parallel to said beam and an operative position in which said arm extends generally vertically downwardly from said beam;

(2) an X-ray source for generating a fan-shaped X-ray beam; said X-ray source being carried by said vehicle; and (3) an X-ray detector mounted on said supporting structure; said X-ray examining system being adapted to travel along the object to be examined while irradiating the object and detecting the X-rays after passage thereof through the object.

2. The X-ray examining system as defined in claim 1, further comprising means for a height adjustment of said beam relative to said vehicle.

3. The X-ray examining system as defined in claim 1, wherein said X-ray source is attached to said column for rotation therewith as a unit about said axis.

4. The X-ray examining system as defined in claim 1, wherein said X-ray detector is composed of a plurality of X-ray detector elements mounted on said beam and said arm, in said operative position of said arm said detector elements being arranged in an L-shaped pattern.

5. The X-ray examining system as defined in claim 1, wherein said vehicle includes a driver's cab situated externally of a danger zone in which said X-ray source and said X-ray detector operate.

* * * * *